(12) United States Patent
Michaelis et al.

(10) Patent No.: US 10,101,153 B2
(45) Date of Patent: Oct. 16, 2018

(54) METHOD AND DEVICE FOR DETECTING DEVIATIONS OF AN OBJECT SURFACE

(71) Applicant: INB Vision AG, Magdeburg (DE)

(72) Inventors: Bernd Michaelis, Biederitz (DE); Tilo Lilienblum, Magdeburg (DE); Sebastian Von Enzberg, Magdeburg (DE)

(73) Assignee: INB Vision AG, Magdeburg (DE)

( * ) Notice: Subject to any disclaimer, the term of this patent is extended or adjusted under 35 U.S.C. 154(b) by 388 days.

(21) Appl. No.: 14/423,393

(22) PCT Filed: Jul. 25, 2013

(86) PCT No.: PCT/DE2013/200076
§ 371 (c)(1),
(2) Date: Feb. 23, 2015

(87) PCT Pub. No.: WO2014/032661
PCT Pub. Date: Mar. 6, 2014

(65) Prior Publication Data
US 2015/0276397 A1   Oct. 1, 2015

(30) Foreign Application Priority Data

Aug. 27, 2012 (DE) .................. 10 2012 215 195
Aug. 28, 2012 (DE) .................. 10 2012 215 215

(51) Int. Cl.
*G01B 21/30* (2006.01)
*G01B 21/04* (2006.01)
(Continued)

(52) U.S. Cl.
CPC ........... *G01B 21/30* (2013.01); *G01B 21/047* (2013.01); *G01B 21/20* (2013.01); *G06T 17/30* (2013.01)

(58) Field of Classification Search
CPC combination set(s) only.
See application file for complete search history.

(56) References Cited

U.S. PATENT DOCUMENTS 6,044,569 A     4/2000  Ogihara et al.
7,149,337 B2   12/2006  Michaelis et al.
(Continued)

FOREIGN PATENT DOCUMENTS

CN          85104875 A    12/1986
CN        1985104875 A    12/1986
(Continued)

OTHER PUBLICATIONS

Li, Yadong, et al., "Free-form surface inspection techniques state of the art review", *Computer-Aided Design*, Feb. 28, 2004, pp. 1395-1417, vol. 36, Elsevier, Ltd., U.K.
(Continued)

*Primary Examiner* — Mamadou Diallo
(74) *Attorney, Agent, or Firm* — Alston & Bird LLP (57) ABSTRACT

The invention relates to a method for detecting deviations of an object surface using a comparison between measured data of the surface and specified reference data. A surface description, at least portions of which are parametric, is generated as a target surface model using the specified reference data, and the comparison is carried out using the target surface model and the measured data. The invention likewise relates to a device for detecting deviations of an object surface using a comparison between measured data of the surface and specified reference data.

16 Claims, 4 Drawing Sheets

(51) Int. Cl.
*G01B 21/20* (2006.01)
*G06T 17/30* (2006.01)

(56) References Cited

U.S. PATENT DOCUMENTS

| | | | |
|---|---|---|---|
| 8,212,993 B2 | 7/2012 | Prams et al. | |
| 8,848,201 B1* | 9/2014 | Bruce | G01B 11/24 356/601 |
| 2009/0079972 A1 | 3/2009 | Schleith et al. | |
| 2010/0164951 A1 | 7/2010 | Stewart et al. | |
| 2011/0157353 A1* | 6/2011 | Takayama | H04N 7/183 348/135 |
| 2014/0336806 A1* | 11/2014 | Bewlay | G06F 17/50 700/98 |
| 2015/0347854 A1* | 12/2015 | Bare | G06K 9/00671 345/633 |

FOREIGN PATENT DOCUMENTS

| | | |
|---|---|---|
| CN | 1191301 A | 8/1998 |
| CN | 1948896 A | 4/2007 |
| CN | 101632001 A | 1/2010 |
| DE | 3938714 A1 | 5/1991 |
| DE | 4023368 A1 | 1/1992 |
| DE | 4321042 C1 | 9/1994 |
| DE | 19753620 C1 | 10/1999 |
| DE | 19925462 C1 | 2/2001 |
| DE | 102004058778 A1 | 8/2005 |
| DE | 202005011807 U1 | 1/2006 |
| DE | 102007037812 A1 | 2/2009 |
| DE | 102011113138 A1 | 10/2012 |
| EP | 0921374 A2 | 6/1999 |
| EP | 0921374 B1 | 4/2005 |
| EP | 1211479 B1 | 11/2008 |
| EP | 2019283 A2 | 1/2009 |
| FR | 2916529 A1 | 11/2008 |
| WO | WO 2008142166 A1 | 11/2008 |

OTHER PUBLICATIONS

Ning, Dai., et al., "3-D Sensing Technology for Object Surface Measurement", *Journal of Nanjing University of Aeronautics & Astronautics*, Dec. 2009, pp. 789-793, vol. 41, No. 6, Editorial Dept. of Journal of NUAA, Nanjing, China.

The State Intellectual Property Office of the P.R.C., First Office Action for Application 201380044658.6, dated Aug. 17, 2016, 7 pages, China.

International Searching Authority, International Search Report (ISR) and Written Opinion for International Application No. PCT/DE2013/200076, dated Nov. 11, 2013, 13 pages, European Patent Office, The Netherlands.

Li, Yadong., et al., "Free-Form Surface Inspection Techniques State of the Art Review", *Computer-Aided Design*, 2004, pp. 1395-1417, vol. 36, Elsevier Ltd., The Netherlands.

International Searching Authority, Written Opinion (English translation) for International Application No. PCT/DE2013/200076, dated Nov. 11, 2013, 4 pages, European Patent Office, The Netherlands.

The State Intellectual Property Office of the P.R.C., Third Office Action, including Supplemental Search Report for Application 201380044658.6, dated Nov. 10, 2017, 10 pages, China.

* cited by examiner

METHOD AND DEVICE FOR DETECTING DEVIATIONS OF AN OBJECT SURFACE

CROSS REFERENCE TO RELATED APPLICATIONS

This application is a national stage application, filed under 35 U.S.C. § 371, of International Application No. PCT/DE2013/200076 filed Jul. 25, 2013, which claims priority to German Application No. 10 2012 215 195.8 filed Aug. 27, 2012 and German Application No. 10 2012 215 215.6 filed Aug. 28, 2012, the contents of both of which as are hereby incorporated by reference in their entirety.

BACKGROUND

Technical Field

The invention relates to a method for recognizing deviations in a surface of an object using a comparison of measured data of the surface and prespecified reference data.

The invention also relates to a device for recognizing deviations in a surface of an object using a comparison of measured data of the surface and prespecified reference data, particularly suitable for carrying out a method according to one of the claims.

The term "surface" should be understood in the broadest possible sense, including both flat surfaces and three-dimensional surfaces—for example molded surfaces and surfaces with textures.

Deviations in a surface—also called surface errors—are small, local shape deviations, such as dents, dings, scratches, cracks, or sink marks, by way of example. These are particularly visible in the case of varnished or glossy surfaces, and have a disadvantageous effect when surface quality is appraised—for example that of body and interior components in the automobile industry, outer skins in the aerospace industry, surfaces of electronic devices, etc. It is particularly difficult to recognize small, local shape deviations on surfaces of flexible components made of materials such as sheet metal or plastic, by way of example. It is possible, by way of example, that a high shape tolerance of the component, and therefore of the surface, can be allowed which is significantly greater than the surface error being detected, due to the deformability or by the variability in the manufacturing process.

Description of Related Art

DE 10 2004 058 778 A1, DE 43 21 042 C1, DE 20 2005 011 807 U1 and DE 10 2007 037 812 A1 have disclosed testing apparatuses for the purpose of recognizing surface errors, which include a suitable illumination arrangement, a camera for the purpose of capturing an image of the components, and an analysis device for analyzing the captured, two-dimensional image. However, in the known methods, it is disadvantageous that the measurement results so obtained depend greatly on the illumination and camera arrangements relative to the surface of the component—that is, they require a great deal of effort to be set-up. Moreover, the known methods are only suitable for large, relatively flat surfaces with minimal curvature, and the surfaces must additionally be convex.

In addition, in the prior art the approach of undertaking a three-dimensional detection of the surface of the component has been disclosed in DE 40 23 368 A1, DE 39 38 714, EP 2 019 283 A2 and DE 199 25 462 C1, by way of example. However, this approach only enables detecting shape deviations with a large extension, or deviations from the theoretical construction data. DE 10 2011 113 138 A1 suggests an analysis of 3D data with a concave filter in order to detect local defects. However, this known method only provides useful results on selected geometries.

In addition, it has also been suggested—in DE 197 53 620 C1, EP 0 921 374 B1 and EP 1 211 479 B1, by way of example—that three-dimensional measured data of the surface of the component be subtracted from a prespecified, error-free reference component. This makes it possible to determine local shape deviations if the allowable large-area shape tolerance is represented by the reference component, but the reference component must have been determined by means of an artificial neural network which was trained in advance with error-free reference data. It is disadvantageous in this case that an extremely large volume of data is created for the model of the reference part due to the artificial neural network. As such, the approach leads, in the case of 50,000 surface points for example, to $2.5*10^9$ weights, which would lead to a data volume of nearly 20 GB if double precision is assumed. If only sub-areas of the entire surface of the object are measured, the data volume is reduced, but this leads to gaps at each of the transition zones, such that these transition zones cannot be appropriately analyzed. Finally, it is an additional disadvantage that an error detection is oriented to a global coordinate system, and it is not possible to take into account small local curvatures of the surface.

BRIEF SUMMARY

The present invention therefore addresses the problem of providing a method and a device for recognizing deviations in a surface of an object using a comparison of measured data of the surface and prespecified reference data, which are less demanding of resources and simultaneously reliably detect even small deviations in the surface of the object. Moreover, the present invention also addresses the problem of providing a method and a device for recognizing deviations in a surface of an object which can be carried out in a simple and cost-effective manner and/or have a simple and cost-effective construction.

The problem above is addressed by the features of the independent claims.

The method according to the invention for recognizing deviations of a surface of an object using a comparison of measured data of the surface and prespecified reference data creates an at least sectionally parametric description of the surface, as a target surface model, by means of the prespecified reference data, and carries out the comparison using the target surface model and the measured data.

The device according to the invention addresses the problem above by the features of the apparatus-based independent claim, according to which the processing device is designed to create an at least sectionally parametric description of the surface, as a target surface model, by means of the prespecified reference data, and to carry out the comparison using the target surface model and the measured data.

The creation of a target surface model in the form of an at least sectionally parametric description of the surface from the prespecified reference data is novel in the present invention. The term "parametric surface description" should be understood in the context of the invention in such a way that it constitutes a mathematical description which is at least sectionally continuous, and wherein any arbitrary three-dimensional position on the surface of the object is exactly defined by a set of typically two, and optionally more, parameters.

In this case, it is advantageous that only parameters are used—rather than all of the reference data—for the target surface model, said parameters enabling a description of the surface of the object. In this way, it is possible to process a significantly larger effective surface for the description of the surface of the object. An additional advantage is that it is thereby very easy to determine arc lengths, curvatures, etc. of the surface in the target surface model. This makes possible, by way of example, a more targeted distribution of points for the comparison between measured data and the target surface model, incorporating the local surface shape, and therefore a more precise recognition of deviations particularly in regions with strong curvature. It is possible to also specify additional higher-order boundary and transition conditions as a result of the at least sectionally parametric description of the surface. This means that, in addition to the condition for the equality of values for boundary points, by way of example, it is also possible to set requirements regarding slope (first derivative) and/or curvature (second derivative), or also higher derivatives. This approach simplifies the processing of very large surfaces composed of different surface regions, because the approach accordingly avoids gaps, irregularities, etc.

Additional features, advantages, and benefits of the embodiment are described in the following dependent claims.

In one advantageous embodiment of the invention, the target surface description is in the form of a spline surface description. This makes it particularly simple to put together a total surface which consists of multiple sub-surfaces, using a basis spline function weighted with spline coefficients.

It can also be contemplated that the surface is described in the form of a spline surface, particularly a hierarchical, tensor-product B spline surface. Such a surface description makes a later comparison with the measured data particularly simple.

A description of the surface in the form of an orthogonal series expansion, such as the Fourier or wavelet deconvolution, for example, can be contemplated as well. The total surface in this case is also described by a sum of basis functions (e.g. sine, cosine, or wavelets), weighted with coefficients.

If the measured data are determined tactilely, optically, and/or by means of sound, particularly ultrasound and/or radar, it is possible, on the one hand, to utilize methods and/or devices which are already known, at least partially, which makes the execution of the method simple and cost-effective. If the measured data are determined by means of an optical, photogrammetric method, particularly in the form of a time correlation and/or phase shift method, it is possible to generate large-area, dense measured data with high depth resolution.

In order to reliably determine the measured data, the measured data are projected onto the surface of the object using a projection of a predetermined pattern sequence, particularly a sine pattern sequence, then the projected pattern sequence is detected optically.

By way of example, the measured data can also be used [sic] by means of deflectometric methods—that is, methods which calculate curvature data and/or three-dimensional data from a mirror image of the surface of the object—heat imaging methods, methods with one-, two-, or three-dimensional data which is obtained using linear cameras or three-dimensional line scanners, and/or methods with two-dimensional images from matrix cameras. In this case, the methods named can be used not only for the measured data within the context of the invention, but also for the purpose of generating real, prespecified reference data by measurements on the real object.

The target surface model can be created by means of a neural network which is trained with a plurality of different data sets of reference data. Even complex surface shapes of the object can be measured by means of the neural network, and even small surface errors can be detected if the data sets of the reference data represent error-free reference objects.

It is particularly advantageous if an at least sectionally parametric description of the surface is created, from the measured data, as a current surface model, and the comparison is carried out as a model comparison of the target surface model and the current surface model. In this way, it is possible to determine deviations by means of the comparison, in a still simpler and more reliable manner.

In order to carry out the comparison reliably, it is further advantageous that the comparison is carried out using an orthogonal distance between the at least sectionally parametric description of the surface and at least one measurement point of the measured data.

In addition, the target surface model can be determined from the prespecified reference data using statistical methods. The advantage in this case is, again, that it is possible to accordingly determine the target surface model even more precisely, which yet further improves the recognition of deviations by means of the comparison.

In some cases, such as in the case of surfaces with locally bounded complex structures, a separate observation from sub-regions is practical. For this purpose the method according to the invention can be applied either once or recursively to the comparison results in a small sub-region. A part of the data which results from the comparison of the measured data and the target surface model serves as the input data for the comparison with a further surface model defined over a smaller sub-region. As such, the method is a multi-step analysis method with multiple target surface models which each characterize one or more smaller sub-regions of the object surface at each step.

The prespecified reference data and/or the measured data are advantageously filtered prior to the creation of the at least sectionally parametric description of the surface, by means of at least one filter method. By way of example, a smoothing of the prespecified reference data and/or the measured data is possible by means of the filter method. In addition, a so-called boundary treatment, masking, or orientation of the prespecified reference data and/or the measured data is likewise possible.

It is particularly advantageous if the prespecified reference data and the measured data and/or difference data between the measured data and the target surface model, calculated from the comparison, are filtered by means of the same filter method. This then avoids the problem, for example in the comparison and in the later analysis of the difference data, particularly in the form of distance data, of artifacts being detected as deviations of the surface by the application of different filter methods.

In order to make it possible to provide sufficient prespecified reference data, it is advantageous to at least partially artificially generate the prespecified reference data, particularly by means of simulation and/or by means of interpolation of measured reference data. For this purpose, a physical simulation of deformations—for example by means of finite elements—can be carried out in order to artificially generate the prespecified reference data. Physical effects such as material expansion due to temperature changes, bowing due to gravitation, and/or additional forces which are applied to the object by fixtures, holder devices, or the like can be simulated by corresponding model specifications. If the free model parameter of the prespecified model varies, it is possible to generate different but similar error-free object data as prespecified reference data. The model parameters in this case can also deviate from actual, real details. In addition, simplified physical deformation models can also be used for the purpose of generating artificial reference data, such as simple spring mass models. For this purpose, it is possible to use measured reference data and theoretical reference data which is obtained from a CAD simulation of at least two different objects, the surfaces and/or properties and position of which are known. In this way, springs can be tensioned between corresponding mass points of the two surfaces of the objects, and the oscillation behavior thereof then provides further prespecified reference data. In addition, additional reference data can also be generated from error-free parts on which error points are detected and corrected by means of other known methods.

As such, known regions in which series errors occur with variable magnitude, for example, can be marked during setup using a so-called area of interest (AOI), and processed with a concave filter, by way of example (cf. DE 10 2011 113 138 A1). The deviation of the surface shape inside the AOI, determined by the other method, can be extracted from the data set and used as the reference data set.

It is also possible to reconstruct the error points removed by the AOI from the data of other parts. For this purpose, the region removed by the AOI is initially not taken into account in the Karhunen-Loève transformation, but is then reconstructed in the inverse Karhunen-Loève transformation.

If the means for capturing includes at least one camera and one illumination device, particularly wherein the illumination device is designed to provide a structured illumination of the surface, the measured data and therefore optionally also corresponding deviations can be determined in an extremely reliable manner.

If the means for capturing includes a linear sensor, the surface can be simply and quickly scanned by means of scanning, thereby producing corresponding measured data. In addition, not only the measured data, but also corresponding reference data can be obtained by means of the scanning method using the illumination device and linear sensor named above.

In order to be able to recognize the comparison and therefore deviations of a surface even more precisely, a target surface model which is adapted to the measured data can be created and used for the comparison. An adapted target surface model can be obtained, by way of example, by first generating a surface model only from the reference data. Next, parameters and/or characteristic values are determined. The measured data is then projected in this [manner] to thereby provide an adapted target surface model. In addition, an adaptation of the target surface model can also be achieved by specifying conditions specifically at boundary and transition regions of, and/or between, different segments of the parametric surface description. As such, boundary and transition conditions of higher orders, by way of example, can be prespecified—that is, that in addition to the condition for the equivalence of values for boundary points, by way of example, requirements can also be set regarding slope (first derivative) and/or curvature (second derivative), or even higher derivatives. This approach simplifies the processing of very large surfaces composed of different surface regions, because the approach accordingly avoids gaps, irregularities, etc. in this way.

BRIEF DESCRIPTION OF THE FIGURES

At this point, there are different options for embodying and implementing the teaching of the present invention in an advantageous manner. Reference is hereby made, on the one hand, to the claims, as mentioned and described above, and on the other hand to the following explanation of preferred embodiments of the invention with reference to the drawings. In combination with the explanation of preferred embodiments of the invention with reference to the drawings, preferred embodiments and implementations of the teaching are explained in general.

In the drawings.

DETAILED DESCRIPTION OF VARIOUS EMBODIMENTS

Figure 1:
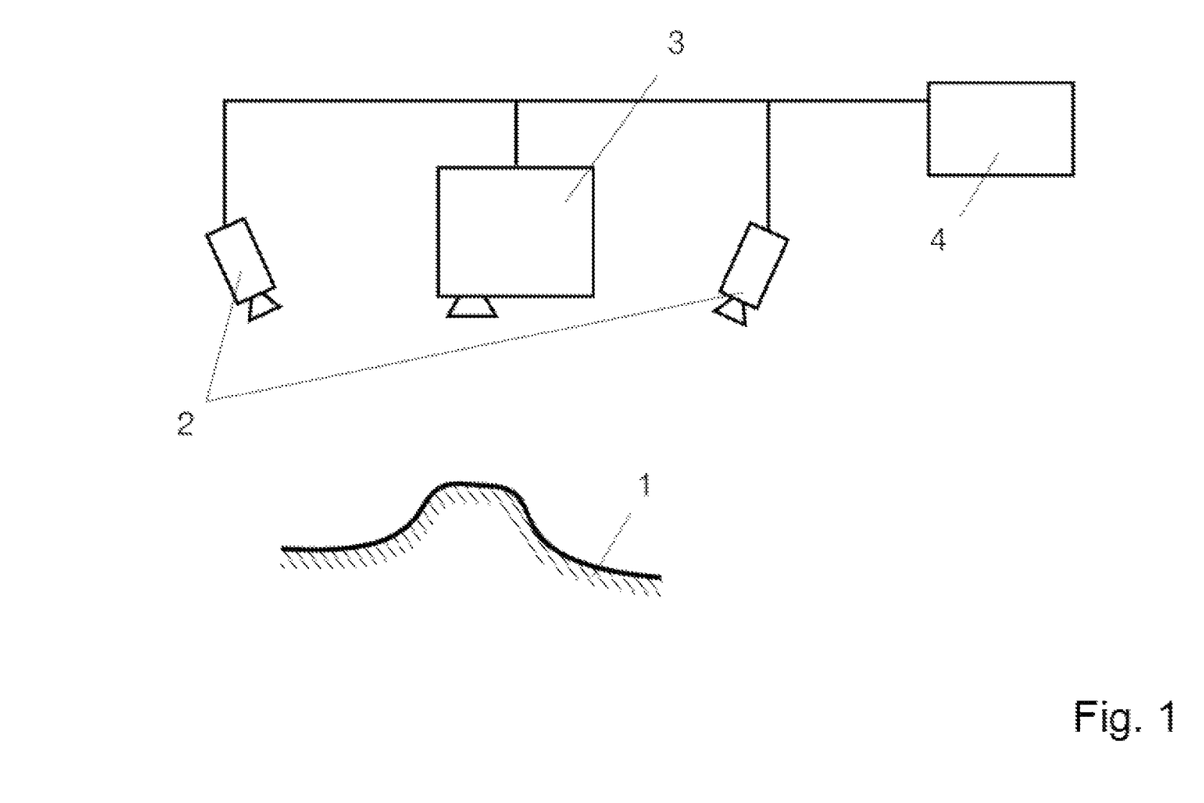
FIG. 1 shows a schematic view, in part, of one embodiment of the fundamental arrangement of a device according to the invention, which uses the method according to the invention.

FIG. 1 shows a schematic view, in part, of one embodiment of the fundamental arrangement of a device according to the invention, which uses the method according to the invention.

FIG. 1 shows a surface of an object being measured, with reference number 1. In addition, two cameras 2 and a projector 3 are arranged between the two cameras 2. Both the cameras 2 and the projector 3 are connected to a processing and control device 4 which controls the cameras and the projector. In order to measure the surface 1, the projector 3 projects a sine-shaped stripe pattern onto the surface 1 which is shifted in certain chronological steps by a certain phase difference. The surface 1 is captured by the cameras 2 with each projected pattern, such that a sequence of images is created in each case with a certain chronological sequence of grayscale values. The cameras 2 transmit the captured images to the processing and control device 4 such that the processing and control device 4 can find image points in the cameras therefrom which lead to discrete three-dimensional measurement points of the surface 1 of the object if the camera arrangement and/or position is known, and/or by triangulation.

Figure 2:
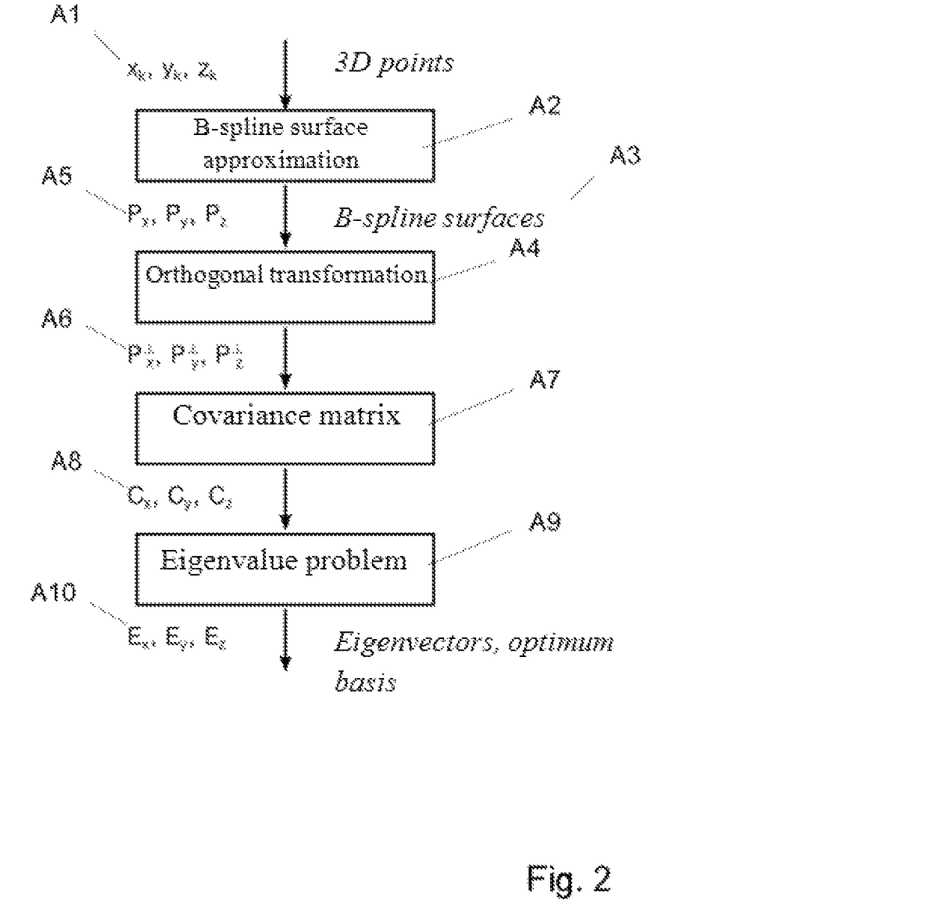
FIG. 2 shows a process diagram, in part, of one embodiment of a method according to the invention for the purpose of obtaining a target surface model.

FIG. 2 shows a process diagram, in part, of one embodiment of a method according to the invention for the purpose of obtaining a target surface model.

FIG. 2 shows how input values A1 for the training of a neural network are input to give the target surface model in the form of three-dimensional points. In a first step A2, a B-spline surface description is calculated from the reference data A1. Various different known methods can be used for this purpose. In addition, the number of control points, and a structure of knot vectors, can be constant for all reference data, and can particularly be determined from a computer aided design model of the surface 1 of the object. If tensor product B-spline surfaces are used for the description of the surface, this leads to a description of the surface in the form of, by way of example, $$s(u,v) = \begin{bmatrix} x(u,v) \\ y(u,v) \\ z(u,v) \end{bmatrix} = \sum_{i=1}^{n}\sum_{j=1}^{m} p_{ij} b_i^k(u) b_j^l(v)$$

wherein the basis functions $b_i^k(u)$ and $b_j^l(v)$ can be constant for all reference data sets, and the control points $p_{i,j}$ and/or resulting control point matrices A5 are characteristic of the surface 1.

In a second step A4, the B-spline basis functions are orthogonalized according to the Gram-Schmidt method, which simplifies a statistical analysis of the data sets of reference data. In this case, an orthogonalization can be simply described as a linear transformation of the control point matrices A5 into orthogonalized matrices A6, with two transformations:

$$P_x^\perp = (\Lambda_u^T)^{-1} P_x (\Lambda_v)^{-1}$$

All reference data sets in this case are statistically analyzed via covariance matrices A8 which are determined in a third step A7 from the orthogonalized control point matrices A5 of the reference data sets:

$$C_x = \sum_k p_{xk}^\perp (p_{xk}^\perp)^T$$

In order to obtain an optimum basis for the description of the surface 1 in the reference data, the following eigenvalue problem is solved in a fourth step A9 for the covariance matrices A8:

$$C_x e_{x,i} = \lambda_{x,i} e_{x,i}$$

In this way, eigenvectors $e_{x,i}$ and matrices $E_x$ of eigenvectors A10 are obtained, which constitute an optimum basis. In this case, a small number—particularly between 10 and 20—of basis functions is sufficient to describe a similar surface, rather than all of the B-spline basis functions.

Figure 3:
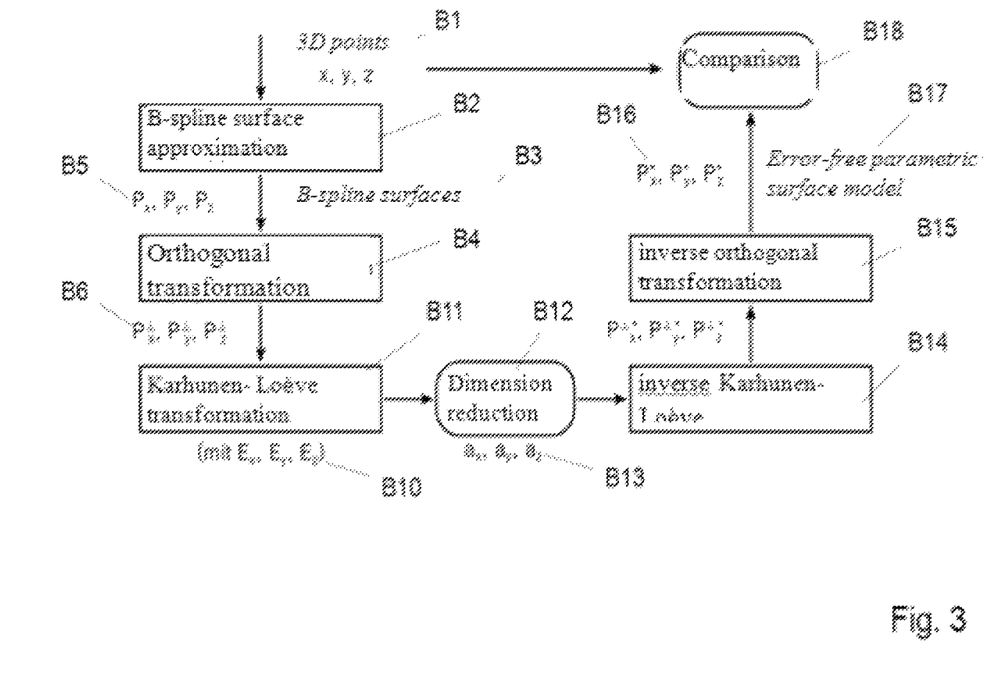
FIG. 3 shows a process diagram, in part, of one embodiment of a method according to the invention, for a comparison.

FIG. 3 shows a process diagram, in part, of one embodiment of a method according to the invention, for a comparison.

FIG. 3 shows how steps which are analogous to those in FIG. 2 are initially carried out using the measured data B1. In this case, steps B2 and B4 correspond to steps A2 and A4 in FIG. 2. The orthogonalized matrices B6 are projected in a further step B11 onto the eigenvectors of the optimum basis of the target surface model, indicated by reference number A10:

$$a_x = E_x P_x^\perp$$

which is known as a Karhunen-Loève transformation KLT. In a further step B12, only first, significant coefficients are selected—indicated with the reference number B13. As a result, untypical variations—meaning those not contained in the reference data sets—of the surface, such as surface defects or measurement noise, for example, are no longer contained in the surface description. The generation of the target surface shape is substantially a reduction in the dimension of the region transformed in the KLT, according to step B12.

To obtain a comparison model based on the measured data B1 for the target surface shape, an inverse KLT transformation is then carried out in a further step B14, according to $$P_x^{\perp *} = E_x^T a_x$$

as well as an inverse orthogonal transformation, in a further step B15, according to $$P_x^* = \Lambda_u^T (P_x^{\perp *}) \Lambda_v$$

In this way, filtered control points B16 are obtained which describe the target surface shape, adapted to the measured data B1. The error-free parametric surface model B17 obtained in this way, in the form of a B-spline surface, can then be used in a further step to recognize deviations, using the measured three-dimensional points B1 of the surface, by means of a comparison.

Figure 4:
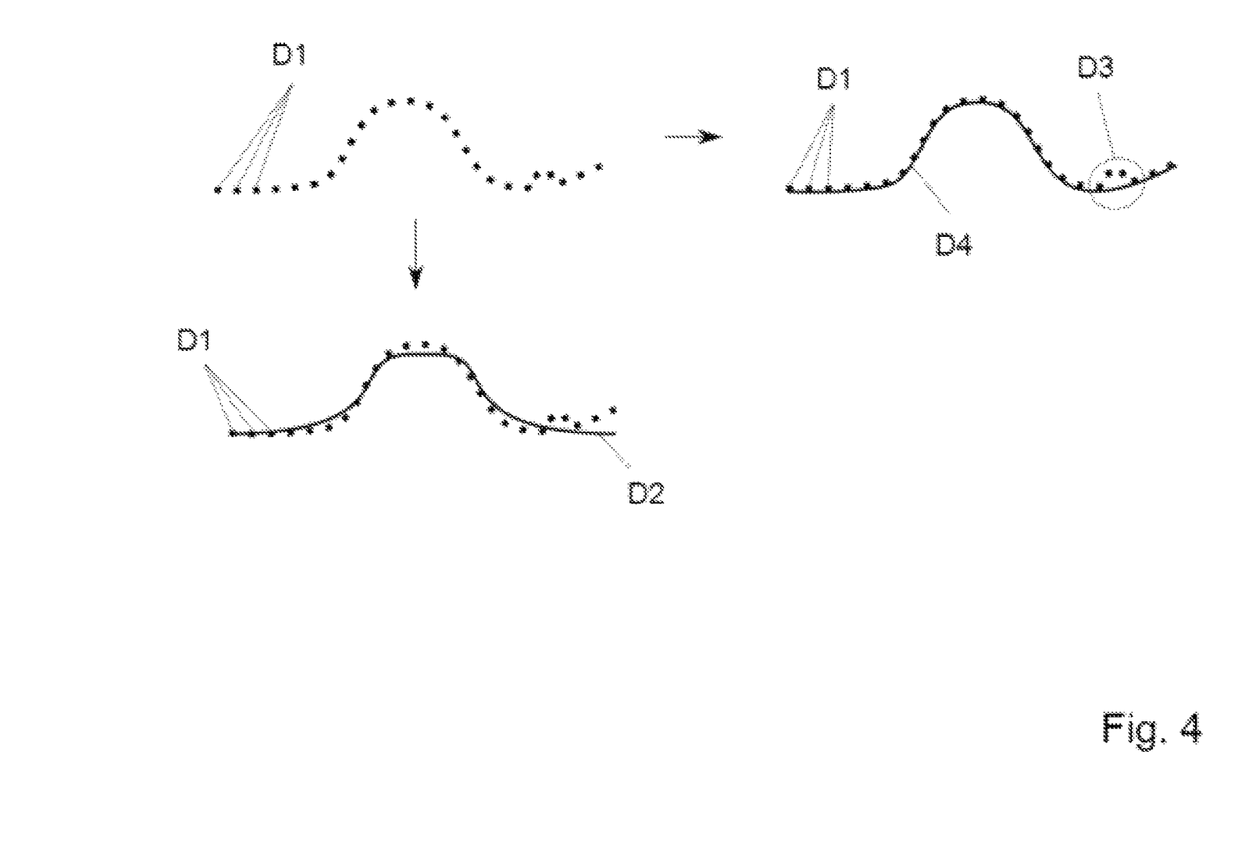
FIG. 4 shows a schematic view, in part, of one embodiment of a method according to the invention, wherein a deviation of the surface is illustrated therein.

FIG. 4 shows a schematic view, in part, of one embodiment of a method according to the invention, wherein a deviation of the surface is illustrated therein.

FIG. 4 shows, at top left, measured data—by way of example three-dimensional points D1 which correspond to the three-dimensional measured data B1 in FIG. 3. FIG. 4 shows an adapted target surface D4 at top right, together with the measured data D1. A deviation D3 of the target surface shape D4 is shown in the region at right. FIG. 4 shows a corresponding comparison with a general, theoretical computer aided design model D2—for example obtained from construction data—at lower left. If the distance of the measured data D1 from the target surface shape D4 is now determined, it is possible in this way to determine surface defects as local deviations D3. In contrast to the method according to the invention, particularly in the embodiment shown in FIGS. 1-4, the CAD model D2 does not allow recognition of the surface error D3.

In summary, the invention relates to a device and a method according to which it is possible to reliably, simply, and precisely determine deviations and/or surface defects of surfaces of objects, in a manner demanding fewer resources, by a parametric surface description, particularly in the form of spline descriptions. The invention can be used particularly in fields in which there is the necessity of detecting the shape of large surfaces with high precision. The invention is particularly suitable for use in the field of surface testing technology.

As concerns further advantageous embodiments of the teaching according to the invention, reference is hereby made to the general portion of the description and to the attached claims, to avoid repetition.

Finally, it is hereby expressly noted that the embodiments of the teaching according to the invention described above only serve the purpose of explaining the claimed teaching, and do not limit the same to the embodiments presented.

As such, it is possible, by way of example, to include potential T node control points in the parametric surface description, the same additionally in the form of a T-spline surface or spline surface as well. Likewise, it is possible to derive a parametric surface description from an implicit description of the surface based on, by way of example, conic sections, or quadrics in general, in multi-dimensional space. All spline surfaces in this case can also be based on an identical grid of nodes.

The measured data can be in the form of unordered, three-dimensional point clouds and/or having regular or irregular known grids. In addition, the input data and/or the measured data used to determine the target surface model and/or the comparison model or the current surface model can be in the form of a volume of 3-, 4-, or m-cornered faces, or in STL format. The target surface model in this case can be composed of the basis functions for the Karhunen-Loève transformation of the sets of reference data. The neural network can likewise be designed as an autoassociative neural network. The parameters of the parametric surface description, particularly following a suitable pre-processing, can be used for the training of the neural network. The pre-processing in this case can be designed in the form of an orthogonalization of the spline functions. The sets of reference data can furthermore comprise partial or complete data which originates from and/or is based on available measurements and/or computer aided design data. Finally, it is possible to restrict the target surface model by one or more side conditions which are not specified by the sets of reference data.

LIST OF REFERENCE NUMBERS 1 surface
2 camera
3 projector
4 processing and control device
A1, B1 three-dimensional points
A2, B2 B-spline surface approximation
A3, B3 B-spline surface
A4, B4 orthogonal transformation
A5, B5 control point matrices
A6, B6 orthogonalized matrices
A7 determination of the covariance matrix
A8 covariance matrix
A9 eigenvalue problem
A10 eigenvectors
B11 Karhunen-Loève transformation
B12 dimension reduction
B13 significant coefficients
B14 inverse Karhunen-Loève transformation
B15 inverse orthogonal transformation
B16 filtered control points
B17 error-free parametric surface model
B18 comparison
D1 measurement points
D2 general CAD model
D3 local deviation
D4 target surface description

The invention claimed is:

1. A method for recognizing deviations (D3) of a surface (1) of an object, said method comprising the steps of:
generating, via a computing unit, pre-specified machine-readable reference data (A1);
computing, via the computing unit, an at least sectionally parametric machine-readable description of the surface (1) as a target surface model (D4), said at least sectionally parametric machine-readable description of the surface (1) being computed based at least in part upon the pre-specified machine-readable reference data (A1);
capturing, via a sensing unit, measured data (D1) of the surface (1), said sensing unit being configured to capture data at least one tactilely, optically, or via sounds, the sounds comprising at least one of ultrasonic or a radar; and
performing, via the computing unit, a comparison of the measured data (D1) of the surface (1) captured via the sensing unit with the pre-specified machine-readable reference data (A1), the comparison being carried out based upon said target surface model (D4),
wherein the target surface model (D4) is computed, via the computing unit, from the pre-specified machine-readable reference data (A1) using statistical methods, with a plurality of different data sets of reference data (A1).

2. A method according to claim 1, wherein the parametric target surface description (1) is a spline surface description.

3. A method according to claim 2, wherein a particularly hierarchical, tensor product B-spline surface is used as the spline surface description.

4. A method according to one claim 1, wherein the measured data (D1) is determined via an optical photogrammetric method, particularly in the form of a time correlation and/or phase shift method.

5. A method according to one claim 4, wherein the optical photogrammetric method comprises at least one of a time correlation method or a phase shift method.

6. A method according to claim 4, wherein the measured data (D1) is determined using a projection of a predetermined pattern sequence onto the surface (1) and by a subsequent optical detection of the projected pattern sequence.

7. A method according to claim 6, wherein the predetermined pattern sequence is a sine pattern sequence.

8. A method according to claim 1, wherein:
the target surface model (D4) is created via a neural network which is trained with a plurality of different data sets of reference data (A1);
the at least sectionally parametric description of the surface is created from the measured data (D1) as a current surface model; and
the comparison is carried out as a model comparison of the target surface model (D4) and the current surface model.

9. A method according to claim 1, wherein the comparison is carried out on the basis of an orthogonal distance between the at least sectionally parametric description of the surface (1) and at least one measurement point of the measured data (D1).

10. A method according to claim 1, wherein a target surface model (D4) which is adapted to the measured data (D1) is created and used for the comparison.

11. A method according to claim 1, wherein:
at least one of the pre-specified reference data (A1) or the measured data (D1) are filtered prior to the creation of the at least sectionally parametric description of the surface via at least one filter method; and
the pre-specified reference data (A1) and at least one of the measured data (A1) or the difference data, from the measured data (A1) and the target surface model (D4), calculated from the comparison, are filtered via the same filter method.

12. A method according to claim 1, wherein the prespecified reference data (A1) is generated at least partially artificially.

13. A device for recognizing deviations (D3) in a surface of an object using a comparison of measured data (D1) of the surface and pre-specified machine-readable reference data (A1) and for carrying out the method according to claim 1, said device comprising:
the sensing unit configured for detecting the measured data (D1) and the reference data (A1); and
one or more processing devices (4) configured to:
compute the at least sectionally parametric machine-readable description of the surface (1) as the target surface model (D4) via the pre-specified machine-readable reference data (A1); and perform the comparison based upon the target surface model (D4) and the measured data (D1),
wherein the target surface model (D4) is determined, via the one or more processing devices (4), from the pre-specified machine-readable reference data (A1) using statistical methods, with the plurality of different data sets of reference data (A1).

14. A device according to claim 13, wherein the sensing unit includes at least one camera (2) and one illumination device (3).

15. A device according to claim 14, wherein the illumination device (3) is configured to provide a structured illumination of the surface (1).

16. A device according to claim 13, wherein the sensing unit comprises a linear sensor.

* * * * *